Nov. 6, 1962    M. O. KALLEBERG ET AL    3,062,683
FIBER-REINFORCED PRESSURE-SENSITIVE ADHESIVES AND TAPES
Filed July 23, 1959
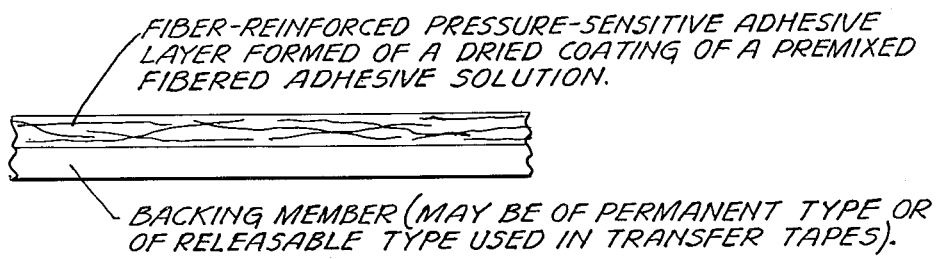
INVENTORS
MELVIN O. KALLEBERG
CHARLES E. TURNER
BY
Carpenter, Abbott, Coulter & Kinney
ATTORNEYS

United States Patent Office 3,062,683
Patented Nov. 6, 1962

3,062,683
FIBER-REINFORCED PRESSURE-SENSITIVE
ADHESIVES AND TAPES
Melvin O. Kalleberg, Minneapolis, and Charles E. Turner, Roseville, Minn., assignors to Minnesota Mining and Manufacturing Company, St. Paul, Minn., a corporation of Delaware
Filed July 23, 1959, Ser. No. 828,938
11 Claims. (Cl. 117—122)

This invention relates to novel pressure-sensitive adhesive compositions and coatings, and tapes embodying such coatings, characterized by the feature that free fibers are dispersed in the adhesive as a fiber reinforcement that greatly increases the cohesive strength, tensile strength, and tear resistance of adhesive coatings thereof.

The invention provides coatable solutions of pressure-sensitive tape adhesive in a volatile vehicle, characterized by the novel feature that the adhesive solution contains staple reinforcing monofibers dispersed therein in a free extended state; such that the fibered adhesive solution is adapted to be coated in a customary way upon a permanent or temporary backing to form, upon drying, a fiber-reinforced pressure-sensitive adhesive coating within which reinforcing fibers are inherently embedded and dispersed in a free extended state. Each fiber in the dry adhesive coating layer is separated from the neighboring fibers and is surrounded by tacky viscoelastic adhesive; and the fibers randomly cross each other to provide both crosswise and lengthwise reinforcement of the layer. Manufacturing economies can be obtained by this simple one-step coating procedure using a premixed fibered adhesive coating solution, as compared with procedures wherein fibers and adhesive are combined during the complete coating operation; and this also results in the fibered adhesive layer having a specifically novel structure and attendant advantages.

Pressure-sensitive tape adhesives commonly have a rubbery base of natural or synthetic rubbery polymer blended with a tackifier resin. Certain synthetic polymers and copolymers (e.g., certain polyvinyl ethers and polyacrylates) have a molecular structure which is inherently rubbery and tacky and can be employed without addition of a tackifying material. These viscoelastic rubbery-base pressure-sensitive tape adhesives are more highly cohesive than adhesive, yet they are aggressively tacky in normal dry form at ordinary temperatures. Adhesive tapes coated therewith will firmly and tenaciously adhere on mere contact and finger pressing to a wide variety of dissimilar surfaces (such as glass, metal, wood and paper), and yet can be unwound from the roll, and can be stripped back from smooth surfaces to which temporarily applied, without offsetting of adhesive material and without gumming the fingers.

The usual tapes intended for sealing, fastening and holding purposes are constructed so that the adhesive coating will remain bonded to the backing and will not delaminate during application or removal.

In the case of so-called adhesive transfer tapes, the adhesive is coated on a removable backing or liner having a low-adhesion or release type surface carrying the adhesive, such as a polyethylene film or a paper coated with a silicone or other release agent. The tape is supplied in roll form and should be capable of being unwound without any offsetting of adhesive at the edges or elsewhere. After application of a piece of tape to the desired base surface, the liner is peeled off when desired so as to expose the adhesive film, permitting of adhering it to another sheet material or to a base surface as a laminating adhesive film. In one usage of such transfer tape, a converter laminates the tape to a metal foil ribbon (which may have label insignia imprinted on the back surface), requiring that the tape be cleanly unwound from supply rolls thereof at the laminating machine. The user of the laminated product, either in roll form or cut into labels or the like, removes the liner at the time of use to expose the pressure-sensitive adhesive, permitting the foil to be adhered to a desired base surface in a dry manner and by mere contact and light pressure.

It has been found that there is a tendency for promiscuous adhesive transfer to occur when rolls of transfer tape are unwound, meaning that portions of adhesive transfer or offset (particularly at the edges) to the contiguous underlying convolution of the backing or liner, this action occurring in an unpredictable manner and despite the cohesive-elastic nature of the adhesive coating which prevents transfer and offsetting in regular tapes. This undesirable effect results from the fact that the adhesive is coated on a low-adhesion or release type of surface to which it has less adherency than it does to the surface of a permanent-type backing as employed in regular adhesive tapes.

We have discovered that this undesirable effect can be eliminated by employing a pressure-sensitive adhesive in which free monofibers are contained as a dispersed phase. Surprisingly, we have found that it is possible to disperse these fibers in the viscid adhesive coating composition so that they are in a free extended state and not clumped together or balled up. We have further found that the fibered adhesive composition can be coated on the backing or liner in a satisfactory manner to provide (after drying) a uniform dried coating in which the fibers are uniformly dispersed in a free extended state within the adhesive film.

A further advantage is that the pressure-sensitive transfer film is rendered self-sustaining and more dimensionally stable. An ordinary unreinforced film of the adhesive is highly stretchy in a free state and has very little tensile strength and tear resistance. The dispersed fibers impart a substantial degree of tensile strength and tear resistance. This is beneficial in increasing the strength of laminated articles in which the fibered adhesive film is a component element—as in the case of the foil laminated article mentioned above.

These beneficial features can also be utilized to advantage in novel adhesive tapes of regular types having permanent fibrous or nonfibrous backings. Thus the fibered adhesive coating of a film-backed tape increases the strength and tear-resistance of the tape as a whole. This permits of using as tape backings those films or foils, particularly when extremely thin, which otherwise would be too flimsy, too weak, and too prone to tearing when the aggressively tacky tape is unwound from the roll. It permits of making tapes of such increased strength and tear resistance that they can be used for sealing, holding or fastening purposes for which they would otherwise be unsuited. For example, thin cellulose acetate films, and thin aluminum foils, can be used as tape backings for making types of tapes for which they otherwise would be unsuited.

The fibers do not materially affect the thickness of the adhesive coating, which can be as thin as it would be in the absence thereof. The fibers are not exposed at the surface and do not materially detract from the adhesive holding force per unit area of the adhesive coating. Fiber-adhesive combinations can be employed in which the refractive indices of the fibers and the dry adhesive are approximately the same, to permit of essentially clear transparent adhesive coatings such as are desired in transparent film-backed adhesive tapes.

The accompanying diagrammatic edge-view drawing illustrates these adhesive tape or sheet products wherein a permanent or temporary backing member carries a fiber-reinforced pressure-sensitive adhesive layer formed of a dried coating of the premixed fibered adhesive solution.

A further illustration of usage is in the manufacture of linerless double-coated pressure-sensitive adhesive tapes, which are wound directly upon themselves to provide a roll having no interwound liner or separator. This is possible owing to the use of a pair of disparate front and back adhesive coatings which are chemically different and physically incompatible, preventing blocking together of the contacting adhesive surfaces in the wound roll. (See the U.S. patent of one of us, M. O. Kalleberg, No. 2,889,038, issued June 2, 1959.) When one or both of the adhesive coatings is fibered, there is a greater safety factor in unwinding tape rolls to avoid offsetting or transfer of adhesive, and a stronger and more tear-resistant tape can be obtained without sacrifice of desired thinness and transparency features.

The fibers can appropriately be designated as extruded staple monofibers. By "extruded" it is meant that they are produced by extruding continuous filaments through an orifice so as to be smooth-surfaced and uniform. By "staple" it is meant that they are chopped from continuous filaments so as to have a length in the range of about ¼ to 1½ inches. By "monofibers" it is meant that they are free individual fibers as distinguished from fibers which are twisted or spun together as yarns. A variety of such manmade (synthetic) staple fibers are commercially available in the textile industry. Glass fibers are preferred but satisfactory use can be made of organic fibers, such as polyamide fibers and polyester fibers. These staple fibers may be of various diameters or denier values, ranging from about 1 to 25 microns in diameter.

The adhesive can be loaded with the dispersed fibers over a considerable proportion range, the choice depending on the properties desired to be imparted to the ultimate adhesive coatings. When low loadings are used (½ to 10% by weight on dry basis), the fibers are easily dispersed by mixing with the adhesive solution and the resultant fibered solution can be readily coated wtih conventional tape coating equipment. When higher loadings, in the 10 to 20% range, are employed, greater care must be used to effect complete dispersion; however it is not necessary for some usages that there be complete dispersion since some clustering of fibers can be tolerated. It may be found necessary to provide the coating head with a special agitator to maintain the dispersion in a coatable state. Even higher fiber loadings, up to about 30% in the case of glass fibers, can be employed.

The usual coating operation tends to lay the fibers in a predominately machine direction (the lengthwise direction of the travelling web). This is beneficial in increasing the lengthwise tensile strength and crosswise tear-resistance of the tape product (slit from the dried web) as compared to one in which the fibers are randomly directed with no predominating direction.

*Example 1*

A viscous pressure-sensitive adhesive coating composition was prepared by dissolving 100 parts by weight of a tacky copolymer of isooctyl acrylate and acrylic acid (95.5:4.5 ratio) in 100 parts of volatile solvent (consisting of 80 parts heptane and 20 parts propyl alcohol). This is a known type of tape adhesive coating composition (see U.S. Patent No. 2,884,126, issued April 28, 1959). The solution was subjected to mixing in a commercial Pfaudler reaction kettle equipped with mixing blades, and addition was made of 5 parts by weight of glass staple monofibers having a length of ½ inch, which had been chopped from Owens-Corning 150–1/0 glass filament yarn having 204 filaments; the monofiber diameter being approximately 10 microns. These fibers had a conventional surface sizing of starch-polyvinyl alcohol. Mixing resulted in complete dispersion of free extended glass fibers in the adhesive solution.

This fibered adhesive composition was coated on a conventional transfer tape liner; a glassine paper having a silicone release coating on each side. The coated web was passed through an oven to remove the solvent and thus dry the pressure-sensitive adhesive coating and was wound in large jumbo rolls. It was unwound from the latter, slit, and rewound into tape rolls of desired size, without offsetting or transfer of adhesive.

Alternatively, the dry web was laminated to a white-pigmented polyethylene film, slit, and wound into rolls after removal of the paper liner, thus providing rolls of transfer tape having a polyethylene film liner.

Both types of transfer tape were highly satisfactory. The rolls could be unwound at both low and high speeds without any offsetting or transfer of adhesive to obtain clean unimpaired strips of transfer tape. Tapes similarly manufactured, but without using fibers, were prone to highly objectionable transfer of adhesive upon unwinding. The fiber-reinforced adhesive coatings could be separated from the removable liners as tough self-sustaining tacky adhesive films possessed of good tensile strength and tear-resistance. The dispersed fibers were inconspicuous in the transparent adhesive film. They were predominately oriented in the lengthwise direction of the tape.

*Example 2*

A conventional pressure-sensitive adhesive coating composition comprised of latex rubber and tackifier resin dissolved in heptane solvent, was admixed in a paddle-type churn mixer, with 10% by weight (dry solids basis) of the same glass fibers referred to in the preceding example, thereby resulting in a uniform dispersion of free fibers.

A primed cellulose acetate film (serving as a permanent tape backing) was coated with the fibered adhesive, dried, slit and wound into rolls, in the same fashion employed in the manufacture of ordinary acetate film-backed pressure-sensitive adhesive tapes. The transparent tape product was satisfactory and had materially increased tensile strength and crosswise tear-resistance.

Similar satisfactory tapes of the exemplary types described in these examples, have been made using staple rayon fibers, polyester fibers (e.g. "Dacron" fibers) and polyamide fibers (e.g., nylon fibers).

We claim:
1. A viscous coatable solution of viscoelastic pressure-sensitive tape adhesive in a volatile vehicle characterized by containing extruded staple reinforcing fibers dispersed therein in a free extended state, said fibers having a diameter in the range of about 1 to 25 microns and a length in the range of about ¼ to 1½ inches and being present in a dry weight proportion of about ½ to 30%, such that the fibered adhesive solution can be coated and dried to provide an inherently fiber-reinforced viscoelastic pressure-sensitive adhesive layer within which the fibers are dispersed in a free extended state so as to impart a substantial degree of tensile strength and tear resistance.

2. A fibered adhesive solution of claim 1 wherein the fibers are glass fibers.

3. A self-sustaining fiber-reinforced pressure-sensitive adhesive film formed of a dried coating of the fibered adhesive solution of claim 1.

4. A self-sustaining glass-fiber-reinforced pressure-sensitive adhesive film formed of a dried coating of the glass-fibered adhesive solution of claim 2.

5. A process of forming a fiber-reinforced pressure-sensitive coating on a backing member which consists in applying to the backing member a coating of premixed fibered adhesive solution of claim 1 and drying.

6. A process of forming a glass-fiber-reinforced pressure-sensitive coating on a backing member which consists in applying to the backing member a coating of premixed glass-fibered adhesive solution of claim 2 and drying.

7. A pressure-sensitive adhesive transfer tape comprised of a removable liner carrying a releasably adherent fiber-reinforced normally and aggressively tacky viscoelastic pressure-sensitive adhesive layer formed of a dried coating of a premixed solution of adhesive in a volatile vehicle containing extruded staple reinforcing fibers dispersed therein in a free extended state, said fibers having a diameter in the range of about 1 to 25 microns and a length in the range of about ¼ to 1½ inches and being present in a dry weight proportion of about ½ to 30%, the fibers being dispersed within said dried adhesive layer in a free extended state and imparting thereto a substantial degree of tensile strength and tear resistance.

8. A transfer tape according to claim 7 wherein the fibers are glass fibers.

9. A pressure-sensitive adhesive tape comprised of a backing carrying a fiber-reinforced normally and aggressively tacky viscoelastic pressure-sensitive adhesive layer formed of a dried coating of a premixed solution of adhesive in a volatile vehicle containing extruded staple reinforcing fibers dispersed therein in a free extended state, said fibers having a diameter in the range of about 1 to 25 microns and a length in the range of about ¼ to 1½ inches and being present in a dry weight proportion of about ½ to 30%, the fibers being dispersed within said dried adhesive layer in a free extended state and imparting thereto a substantial degree of tensile strength and tear resistance.

10. An adhesive tape according to claim 9 wherein the fibers are glass fibers.

11. An adhesive tape according to claim 9 wherein said backing is a thin film or foil.

References Cited in the file of this patent

UNITED STATES PATENTS

| | | |
|---|---|---|
| 1,270,250 | Schenkelberger | June 18, 1918 |
| 2,838,421 | Sohl | June 10, 1958 |